US008721411B2

(12) United States Patent
Reiger et al.

(10) Patent No.: US 8,721,411 B2
(45) Date of Patent: May 13, 2014

(54) AXIAL FLOW DISRUPTER

(75) Inventors: Bernard D Reiger, Newton, KS (US); Robert A. Matousek, Milan, IL (US)

(73) Assignee: AGCO Corporation, Duluth, GA (US)

( * ) Notice: Subject to any disclaimer, the term of this patent is extended or adjusted under 35 U.S.C. 154(b) by 139 days.

(21) Appl. No.: 13/420,741

(22) Filed: Mar. 15, 2012

(65) Prior Publication Data

US 2012/0244921 A1 Sep. 27, 2012

Related U.S. Application Data

(60) Provisional application No. 61/467,416, filed on Mar. 25, 2011.

(51) Int. Cl.
*A01F 12/24* (2006.01)
*A01F 12/44* (2006.01)
(52) U.S. Cl.
USPC ............................................. 460/108; 460/81
(58) Field of Classification Search
USPC ........... 460/110, 46, 32, 71, 72, 107, 108, 81, 460/83, 109, 66, 69; 56/14.6
See application file for complete search history.

(56) References Cited

U.S. PATENT DOCUMENTS

| 91,658 | A | * | 6/1869 | Nichols ........................ 460/109 |
|---|---|---|---|---|
| 105,344 | A | * | 7/1870 | Lee ............................... 460/110 |
| 107,355 | A | * | 9/1870 | Fuos .............................. 460/71 |
| 132,017 | A | * | 10/1872 | Miller ............................ 460/46 |
| 790,289 | A | * | 5/1905 | Conner .......................... 460/46 |
| 1,570,898 | A | * | 1/1926 | Landis .......................... 460/110 |
| 2,159,664 | A | * | 5/1939 | Lindgren ........................ 460/71 |
| 2,321,019 | A | * | 6/1943 | Dray .............................. 460/71 |
| 3,734,103 | A | | 5/1973 | Mathews |
| 4,004,404 | A | * | 1/1977 | Rowland-Hill et al. ........ 56/14.6 |
| 4,031,901 | A | * | 6/1977 | Rowland-Hill ............... 460/108 |
| 4,075,823 | A | * | 2/1978 | Rowland-Hill ................ 56/14.6 |
| 4,078,571 | A | * | 3/1978 | Todd et al. ...................... 460/66 |
| 4,875,891 | A | | 10/1989 | Turner et al. |
| 5,569,080 | A | * | 10/1996 | Estes .............................. 460/72 |
| 5,816,911 | A | * | 10/1998 | Dwyer ........................... 460/71 |
| 5,885,155 | A | * | 3/1999 | Dwyer et al. ................... 460/72 |
| 6,358,142 | B1 | * | 3/2002 | Imel et al. ..................... 460/109 |
| 6,537,148 | B2 | | 3/2003 | Schwersmann |
| 7,166,026 | B2 | | 1/2007 | Ricketts et al. |
| 7,285,043 | B2 | | 10/2007 | Foster et al. |
| 7,393,274 | B2 | * | 7/2008 | Voss et al. .................... 460/109 |
| 8,313,361 | B2 | * | 11/2012 | Flickinger et al. ............ 460/110 |
| 2007/0178951 | A1 | * | 8/2007 | Voss et al. .................... 460/109 |
| 2011/0151951 | A1 | * | 6/2011 | Regier et al. ................. 460/109 |

* cited by examiner

*Primary Examiner* — Thomas B Will
*Assistant Examiner* — Joan D Misa

(57) ABSTRACT

A combine harvester having a tubular housing that concentrically receives a rotor used for threshing and separating crop materials. Concave assemblies are arranged side-by-side along the a processing system. The processing system also includes at lease one disrupter plate placed between adjacent concave assemblies having an arcuate configuration similar to that of concave assemblies. An upper edge of the disrupter plate projects above the transverse bars and curved rods of the concave assemblies toward the rotor to slow the axial flow of the crop material through the rotor housing. Accordingly, the disrupter plate provides a tortuous flowpath for the crop material as it moves axially through the processing system to permit the more time for threshing and separation to take place.

4 Claims, 4 Drawing Sheets

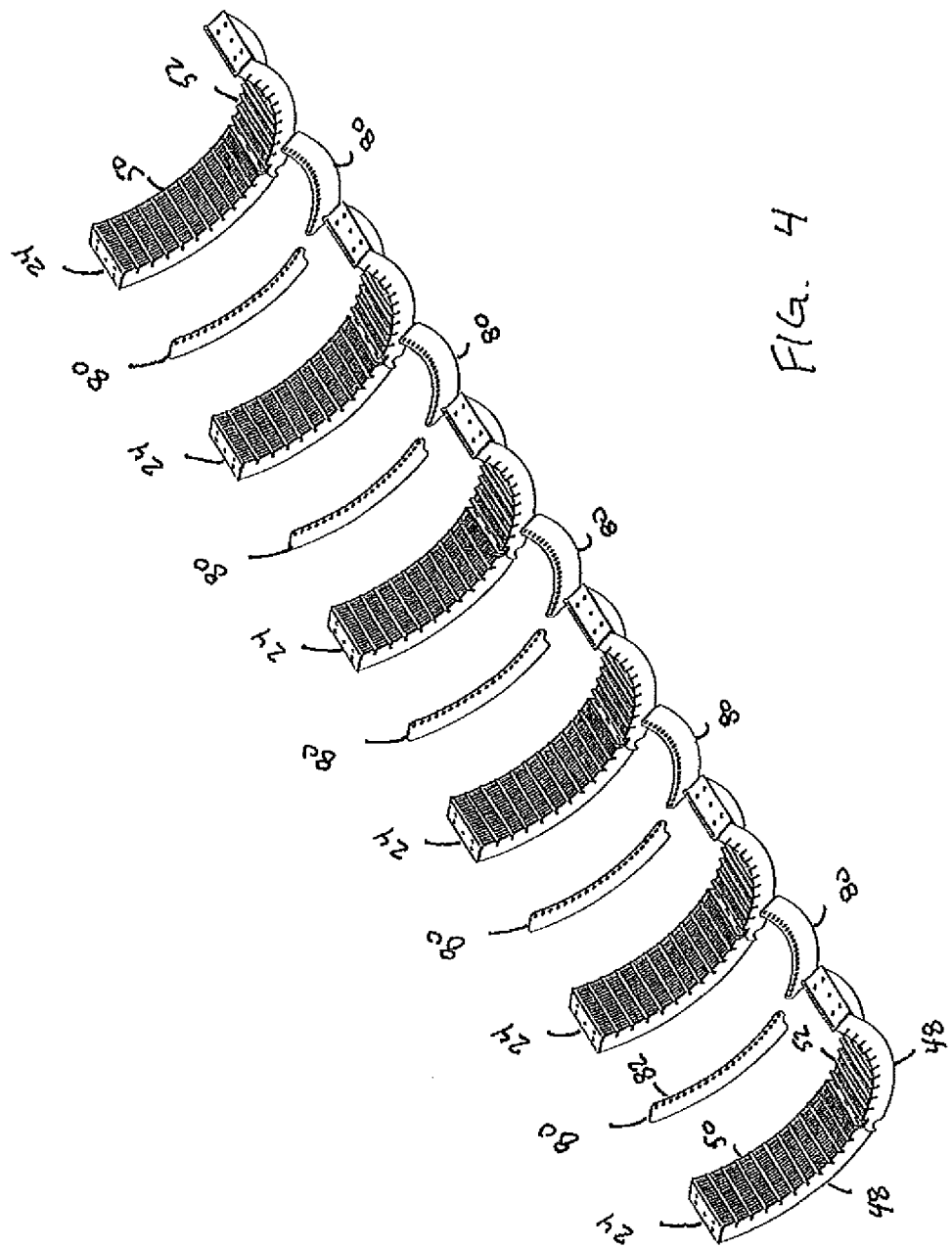

AXIAL FLOW DISRUPTER

CROSS REFERENCE TO RELATED APPLICATIONS

This application claims priority to U.S. Provisional Application No. 61/431,989 filed Mar. 25, 2011, entitled "AXIAL FLOW DISRUPTER".

BACKGROUND OF THE INVENTION

1. Field of Invention

This invention relates to crop harvesting machines of the type that use rotary processing devices, and more particularly to a rotary housing for the crop harvesting machine that provide a tortuous flowpath for the crop material as it moves axially through the processing system to permit more time for threshing and separation to take place.

2. Description of Related Art

In one type of processing system the crop travels axially parallel to and helically around the rotational axis of one or more rotary processing devices commonly referred to as rotors. In other systems, during at least a portion of its travel through the system the crop travels in a transverse or tangential direction relative to the rotational axis of a rotary processing device commonly referred to as a threshing cylinder. In each case, grain is processed between elements affixed to the periphery of the rotary device and arcuate, usually foraminous, stationary processing members in the form of threshing concaves or separating grates that partially wrap around the lower portion of the device.

Because processing systems are utilized to harvest a wide variety of different crops and must function properly in many different operating conditions, it is important to be able to conveniently and accurately adjust the amount of time the crop material spends between the rotary processing devices and stationary processing members to best accommodate these variables.

OVERVIEW OF THE INVENTION

In one embodiment, the invention is directed to a processing system for a combine harvester having a tubular housing that concentrically receives a rotor used for threshing and separating crop materials. The processing system includes a plurality of concave assemblies arranged side-by-side along the axially length of the processing system. Each concave assembly has laterally spaced apart side rails, a plurality of transverse bars that span the side rails and a series of longitudinally extending, laterally spaced apart, curved rods defining apertures through which grain may pass. The processing system also includes at lease one disrupter plate placed between adjacent concave assemblies having an arcuate configuration similar to that of concave assemblies. An upper edge of the disrupter plate projects above the transverse bars and curved rods of the concave assemblies toward the rotor to slow the axial flow of the crop material through the rotor housing. Accordingly, the disrupter plate provides a tortuous flowpath for the crop material as it moves axially through the processing system to permit more time for threshing and separation to take place.

In one embodiment, the width of the transverse bars are such that they are received between side rails with the exception that transverse bars have outwardly projecting overhangs at their opposite ends that overly the side rails and extend at least partially through openings in the disrupter plate and bear against transverse bars of an adjacent concave assembly.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 4 is an exploded view of the concave assemblies of FIG. 3.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following

DETAILED DESCRIPTION

Figure 1:
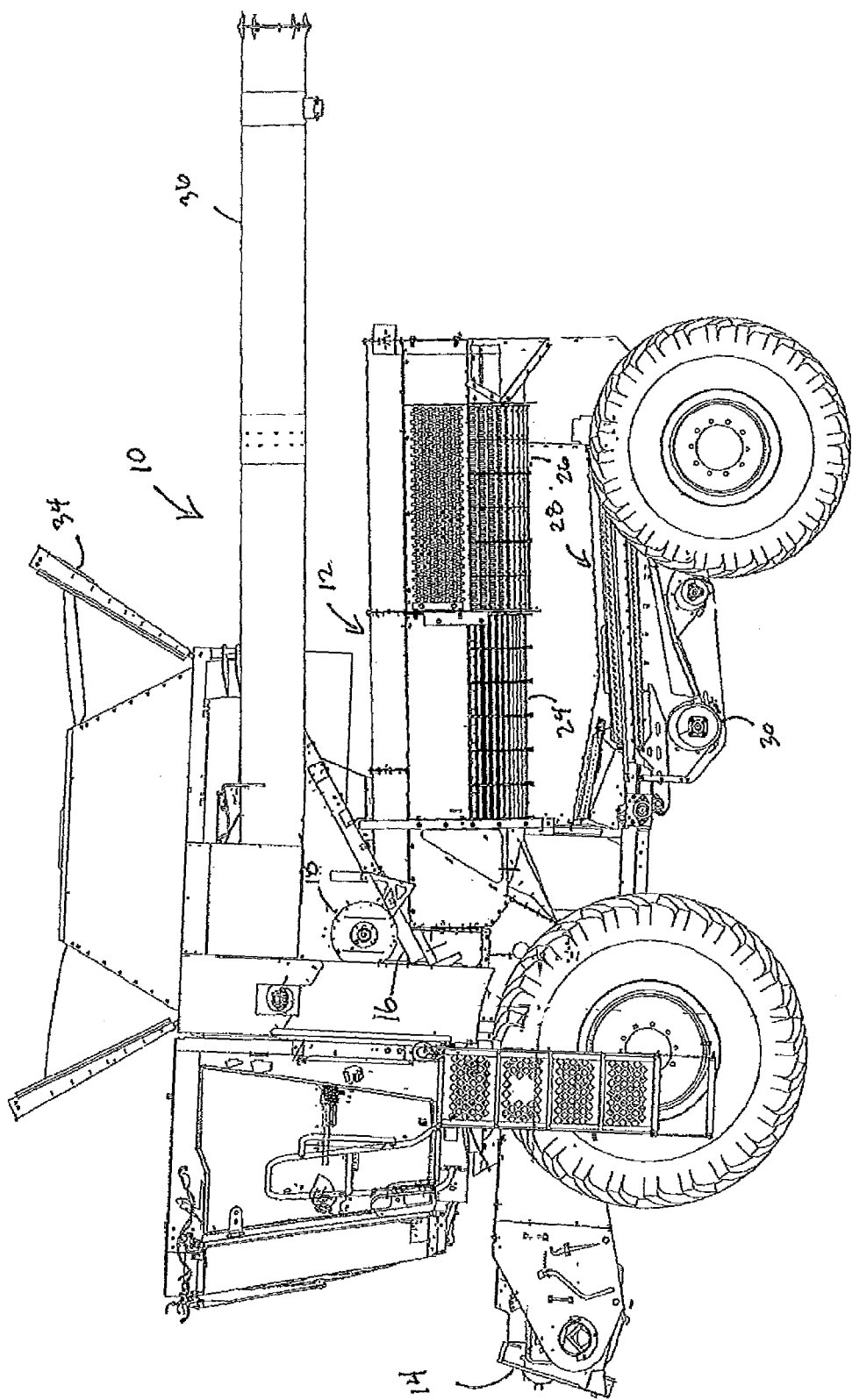
FIG. 1 is a schematic side elevational view of a combine harvester having a processing system utilizing axial flow and incorporating the principles of the present invention, portions of the harvester being broken away to reveal internal details of construction.

The exemplary combine harvester 10 selected for illustration in FIG. 1 has a single axial flow processing system 12 that extends generally parallel with the path of travel of the machine. However, as will be seen, the principles of the present invention are not limited to axial flow harvesters having only a single such processing system. For the sake of simplicity in explaining the principles of the present invention, this specification will proceed utilizing a single axial flow processing system as the primary example.

As well understood by those skilled in the art, in the illustrated embodiment combine harvester 10 includes a harvesting header (not shown) at the front of the machine that delivers collected crop materials to the front end of a feeder house 14. Such materials are moved upwardly and rearwardly within feeder house 14 by a conveyer (not shown) until reaching a beater that rotates about a transverse axis. Beater feeds the material upwardly and rearwardly to a rotary processing device, in this instance to a rotor 20 having an infeed auger 22 on the front end thereof. Auger 22, in turn, advances the materials axially into the processing system 12 for threshing and separating. In other types of systems, conveyor 16 may deliver the crop directly to a threshing cylinder.

Generally speaking, the crop materials entering processing system 12 move axially and helically therethrough during threshing and separating. During such travel the crop materials are threshed and separated by rotor 20 operating in cooperation with preferably foraminous processing members in the form of threshing concave assemblies 24 and separator grate assemblies 26, with the grain escaping laterally through concave assemblies 24 and grate assemblies 26 into cleaning mechanism 28. Bulkier stalk and leaf materials are retained by concave assemblies 24 and grate assemblies 26 and are impelled out the rear of processing system 12 and ultimately out of the rear of the machine. A blower (not shown) forms part of the cleaning mechanism 28 and provides a stream of air throughout the cleaning region below processing system 12 and directed out the rear of the machine so as to carry lighter chaff particles away from the grain as it migrates downwardly toward the bottom of the machine to a clean grain auger 30. Auger 30 delivers the clean grain to an elevator (not shown) that elevates the grain to a storage bin 34 on top of the machine, from which it is ultimately unloaded via an unloading spout 36.

Figure 2:
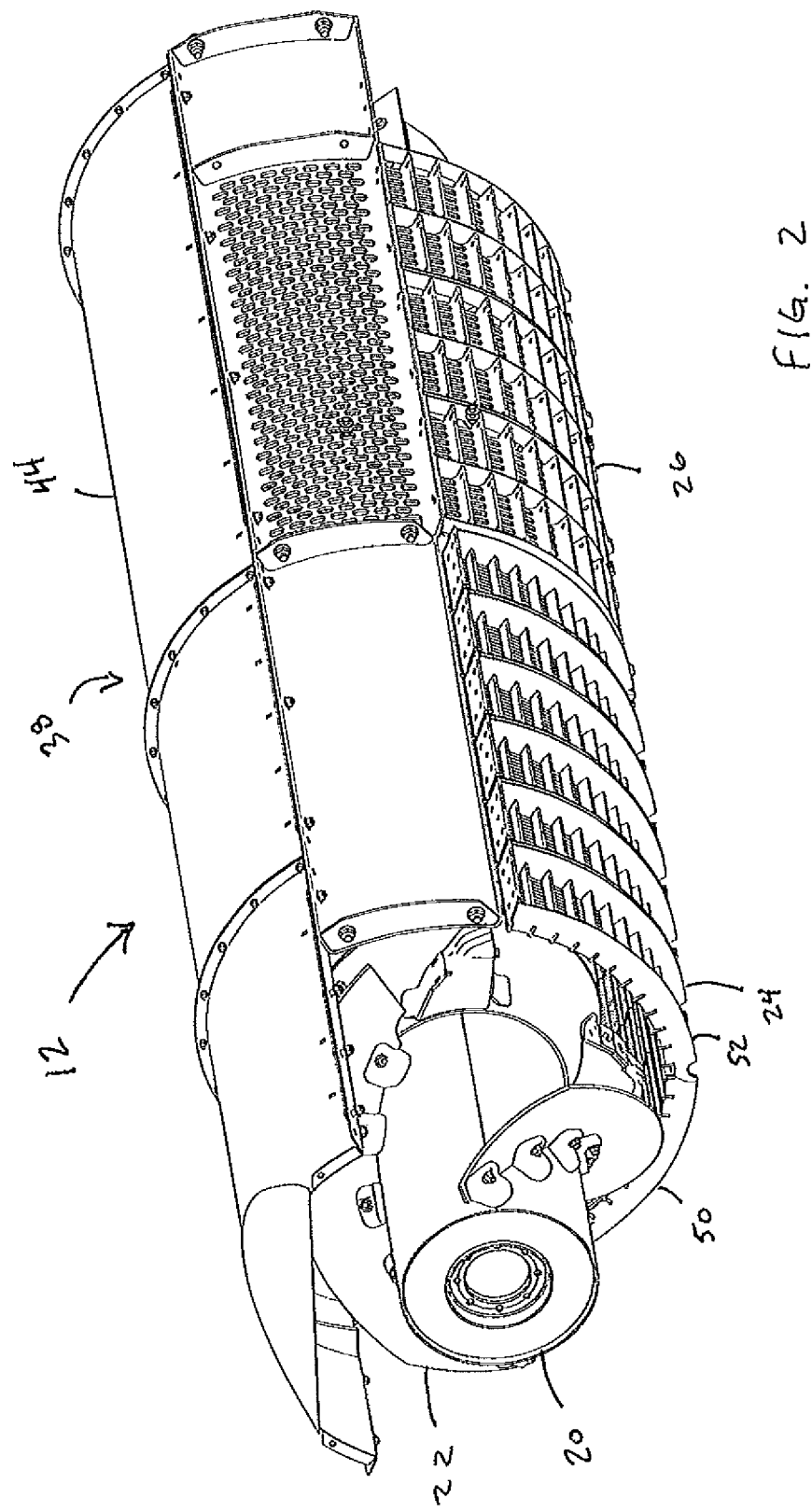
FIG. 2 is an enlarged isometric view of the processing system within the harvester of FIG. 1.
Figure 3:
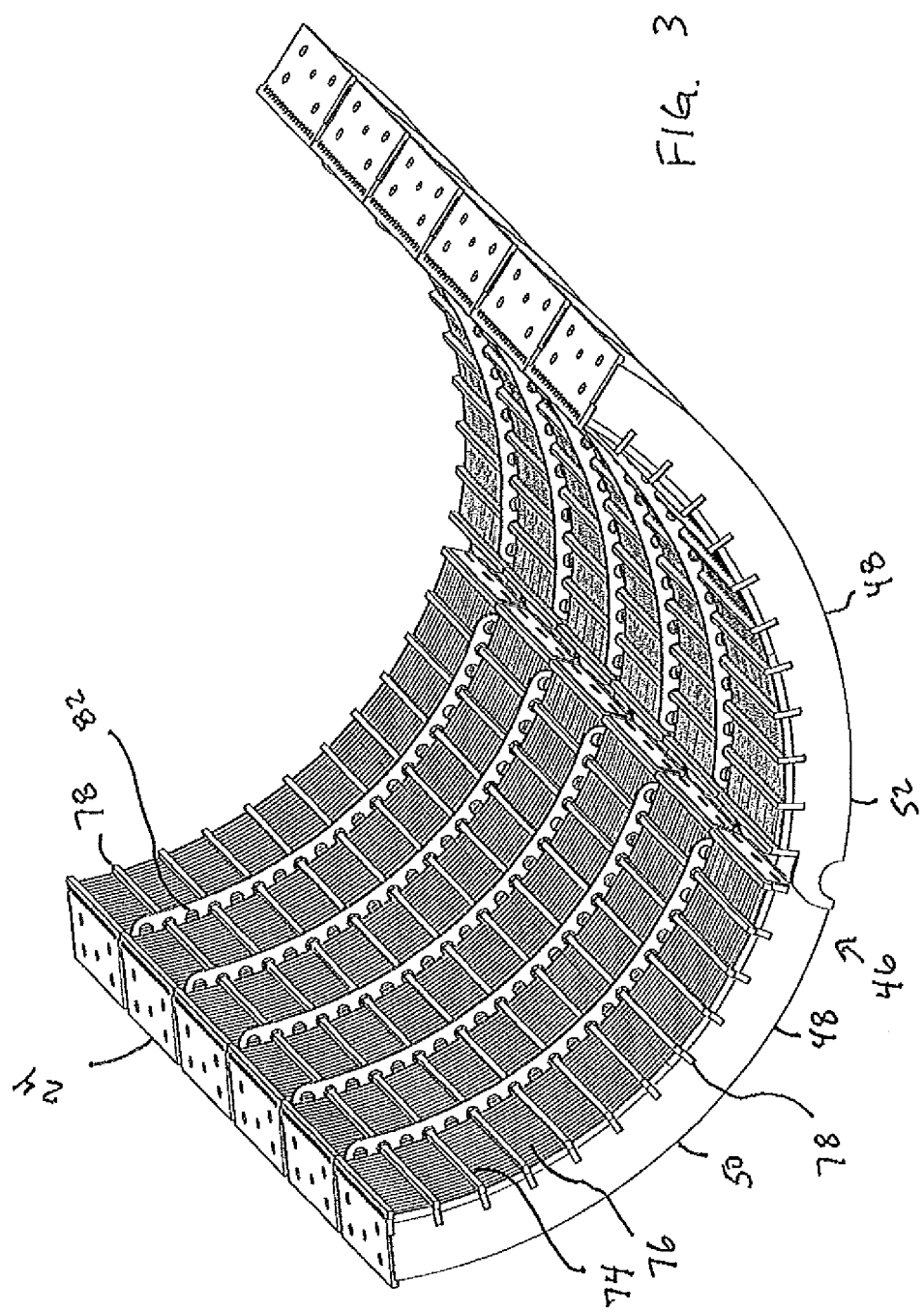
FIG. 3 is an enlarged isometric view of a portion of the processing system of FIG. 2 showing the concave assemblies.

Turning now to FIG. 2, the plurality of concave assemblies 24 and grate assemblies 26 are arranged side-by-side axially along the processing system to form a part of what may be considered a tubular housing 38 that concentrically receives rotor 20 and serves as part of processing system 12. In the illustrated embodiment, six concave assemblies 24 form part of the initial portion of the tubular housing 38. However, one skilled in the art will understand that more or fewer concave assemblies 24 may be used in the tubular housing 38. As illustrated for example in FIG. 2, housing 38 includes a framework 40 supporting a convex top wall 44 that extends the full length of housing 38 and effectively closes off the top portion thereof from front to rear. Framework 40 also supports the threshing concave assemblies 24 and the separator grate assemblies 26.

Desirably, each concave assembly 24 includes a first concave 50 that is pivotally mounted on framework 40 and a second concave 52 that is fixed to framework 40 and does not move relative thereto, in contrast to the pivotal concave 50, such as is shown in commonly assigned U.S. Pat. No. 7,393,274 issued to Voss et al, which is hereby incorporated by reference. The concave assemblies 24 are moved adjustably toward and away from rotor 20 to adjust the running clearance between the rotor 20 and concave assemblies 24 and to change the shape of the threshing region as is known in the art and need to be further discussed herein. A suitable actuator (not shown) is located near the processing system 12 and mounted on portions of the combine harvester frame structure. Preferably, the actuator is remotely operable, such as from the cab of harvester 10. In one preferred embodiment, the actuator comprises an electrically powered linear actuator. It will be appreciated, however, that actuator could comprise a number of different devices, such as a hydraulic cylinder or a turnbuckle, for example.

It will be seen that concave assembly 24 includes a pair of arcuate, elongated and laterally spaced apart side rails 48. The first concave 50 has an arcuate configuration and also includes a plurality of transverse bars 74 that span the side rails 48 on the concave upper side thereof. Bars 74 cooperate with a series of longitudinally extending, laterally spaced apart, curved rods 76 in defining apertures for the concave 50 through which grain may pass. Second concave 52 also has transverse bars 74 that are spaced arcuately along its length and rigidly affixed at their opposite ends to side rails 48. Transverse bars 74 cooperate with a plurality of longitudinally extending curved rods 76 to define orifices within second concave 52 through which grain may pass. The upper edges of transverse bars 74 project above the longitudinally extending curved rods 76 so as to provide a stepped threshing surface that cooperates with rasp-like elements on the rotating rotor 20 for threshing and separating the grain from cobs, husks, and other crop materials. The width of concaves 50, 52 are such that they are received between side rails 48, with the exception that transverse bars 74 have outwardly projecting overhangs 78 at their opposite ends that overly the upper edges of frame side rails 48 and are operable to bear against the same when concave 50 is installed. Overhangs 78 also provide a continuous surface when concave assemblies 24 are installed side-by-side in the combine 10.

According to the invention, a disrupter plate 80 is placed between adjacent concave assemblies 24. As best seen in FIG. 4, the disrupter plate 80 has an arcuate configuration similar to that of frame 46. Outwardly projecting overhangs 78 of the transverse bars 74 extend through openings 82 in the disrupter plate 80. The upper edge 84 of the disrupter plate projects above the transverse bars 74 of the concave assemblies 24 and cooperates with rasp-like elements on the rotating rotor 20 to provide a more tortuous flowpath for the crop material as it moves axially through the processing system 12 over the concave assemblies 24.

In operation, the rotor 20 rotates in a clockwise direction as viewed from the rear of the machine 10. Thus, as crop materials are introduced into the front end of processing system 12, they move helically within and about rotor housing 38 in a counterclockwise direction as FIG. 2 is viewed. The threshing action occurs in a threshing region located generally in the bottom half of the processing system 12, between the periphery of rotor 20 and concave assemblies 24. The disrupter plates 80 slow the axial flow of the crop material through the rotor housing 38 to permit the more time for threshing and separation to take place.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A processing system for a combine harvester having a tubular housing that concentrically receives a rotor used for threshing and separating crop materials, the processing system comprising:

a plurality of concave assemblies arranged side-by-side axially along the processing system, each said concave assembly comprising laterally spaced apart side rails, a plurality of transverse bars that span the side rails and a series of longitudinally extending, laterally spaced apart, curved rods defining apertures through which grain may pass; and at least one disrupter plate placed between adjacent concave assemblies of said plurality of concave assemblies having an arcuate configuration similar to that of the concave assemblies, wherein an upper edge of the at least one disrupter plate projects above the transverse bars and the curved rods of the concave assemblies toward the rotor to slow the axial flow of the crop material through the rotor housing, wherein the width of the transverse bars are such that the transverse bars are received between the side rails with the exception that the transverse bars have outwardly projecting overhangs at opposite ends that overly the side rails and extend at least partially through openings in an adjacent disrupter plate of the at least one disrupter plate.

2. The processing system of claim 1 wherein the at least one disrupter plate provides a tortuous flowpath for the crop material as the crop material moves axially through the processing system.

3. The processing system of claim 1 wherein upper edges of the transverse bars project above the longitudinally extending curved rods so as to provide a stepped threshing surface that cooperates with rasp-like elements on the rotating rotor for threshing and separating crop materials.

4. The processing system of claim 1 wherein the outwardly projecting overhangs of the transverse bars of a first concave assembly bear against outwardly transverse bars of an adjacent concave assembly through the openings in the disrupter plate.

* * * * *